Dec. 26, 1939.   W. G. O. STIEBER   2,184,855
CLAMP CONNECTION
Filed Jan. 10, 1939
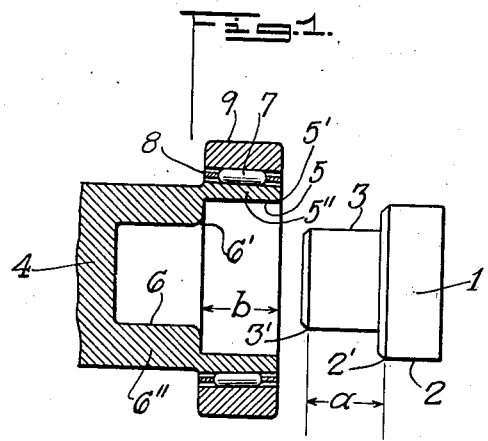
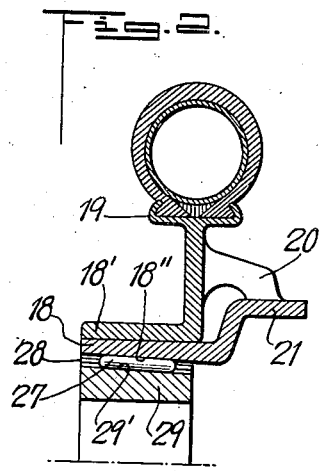
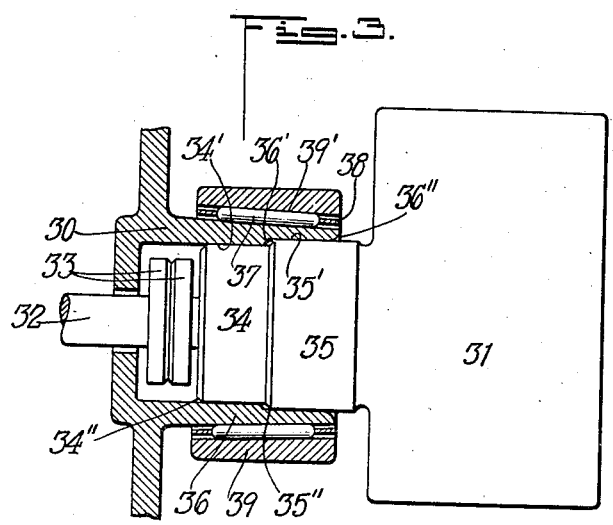
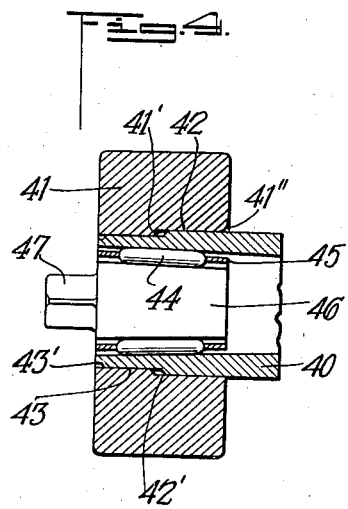
INVENTOR.
WILHELM GUSTAV OTTO STIEBER.
BY Karl A. Mayr
ATTORNEY.

Patented Dec. 26, 1939

2,184,855

UNITED STATES PATENT OFFICE 2,184,855

CLAMP CONNECTION

Wilhelm Gustav Otto Stieber, Munich, Germany

Application January 10, 1939, Serial No. 250,145
In Germany June 18, 1935

1 Claim. (Cl. 287—119)

The present invention relates to a method and means for disconnectably connecting one body to another body and is based on the same idea as the invention disclosed in my copending application Ser. No. 84,502, filed June 10, 1936.

According to the present invention one of the bodies to be connected is provided with a hollow cylindrical part having a cone shaped surface and a plurality of rolling members adjacent to said surface; a tightening member which has a cone shaped surface which corresponds to the first mentioned cone surface is slipped over or inserted into said first mentioned surface leaving the rolling members in between both surfaces; upon axial displacement of said two surfaces with respect to and toward one another the rolling members are pressed to the first mentioned cone surface whereby said cylindrical part is elastically deformed and pressed onto a part of the other body which is to be connected with said first mentioned body and which snugly fits over or into said cylindrical part. Due to frictional engagement both bodies are absolutely rigidly connected and because the deformation of the part which is pressed onto the other is elastic and not permanent the connection can easily be separated by axial displacement of said cone surfaces from one another.

The present invention is suitable for interconnecting small parts but also for attaching large and heavy parts to other members, for example mounting pumps or other machinery to a casing or base, mounting propellers, flywheels, car wheels, etc., to shafts and other similar arrangements. The nature of my present invention assures always true alignment of the connected parts.

If frequent connection and disconnection is required it may be difficult to push the snugly fitting parts of the two objects to be connected into one another. To overcome this difficulty these snugly fitting parts comprise a plurality of axially adjacent situated parts of different diameter whereby the corresponding parts of the two bodies to be connected are of equal length so that all individual corresponding parts engage one another simultaneously. The tightening member may be arranged adjacent to one of the parts of different diameter only or it may be arranged that more or all parts of different diameter participate in making the press joint.

Further and other objects of the present invention will be hereinafter set forth in the accompanying specification and shown in the drawing which, by way of illustration, show what I now consider to be a preferred embodiment of my invention.

In the drawing:

Figure 1 is a part sectional view of a clamp connection according to the present invention.

Figure 2 is a sectional view of a modified clamp connection according to the present invention.

Figure 3 is a sectional view of another modification of the clamp connection according to the present invention.

Figure 4 is a sectional view of still another modification of the clamp connection according to the present invention.

In the embodiment of the invention shown in Fig. 1 of the drawing, the body 1 has two cylindrical parts 2 and 3 of different diameter. Body 1 is to be connected with an object 4 having bores 5 and 6 which correspond to the parts 2 and 3 respectively. The distance $a$ between the two edges 2' and 3' of body 1 which enter the bores 5, 6 of body 4 is equal to the distance $b$ between the edges 5' and 6' of body 4 which are simultaneously passed over by the edges of body 1. When body 1 is inserted into body 4 cylinder 2 enters bore 5 at the same moment at which cylinder 3 enters the bore 6. Sticking and jamming is thereby made impossible. Clamping or tightening of body 1 to body 4 is then carried out by means of revolving and axial displacement of the tightening or pressing member 9 which forces the rollers 7 in cage 8 onto the cylindrical part 5'' and the surface 5 of the latter onto cylindrical part 2. The method used is the same as described in my copending application Ser. No. 84,502. The cooperating and tension producing surface in the present application of the invention are the interior surface of the tightening member 9 and the exterior surface of the cylindrical extension 5'' of body 4 which extension contains the fitting surface 5. The deformation of the hollow cylinder part 5'' is elastic and not permanent so that the connection can be separated by releasing the tightening member 9.

It is obvious that instead of providing the cylindrical extension 5'' with a cone shaped exterior surface, part 6'' may be provided with a cone surface and a tightening member having an interior cone surface applied adjacent thereto or both parts 6'' and 5'' may be provided with cone surfaces and cooperating tightening members.

The embodiment of my invention illustrated in Fig. 2 uses the new idea of tightening the rim 19 of a wheel, for example, of a motor car to its hub part. The latter has two cylindrical parts 18 and 21 of different diameter. Part 18 fits into cylindrical part 18' of the wheel rim 19. Instead of another cylindrical part which corresponds to part 21 the rim part 19 is provided with a plurality of guide laps 20 which slide onto part 21 at the same time as part 18' slides onto part 18 when the rim is applied to the hub. Part 18 is hollow and interiorly provided with a cone shaped surface 18" which corresponds to the cone shaped surface 29' of the tightening member 29. In between the two cone surfaces rollers 27 held in position by means of a cage 28 are provided. Upon turning and moving member 29 into the cylinder part 18 the latter is expanded and pressed onto part 18' whereby the wheel rim is tightly and rigidly connected with the wheel hub. The action and operation of the device shown in Fig. 2 is fundamentally the same as that of the device illustrated in Fig. 1; the only difference is that the tightening member is situated within instead of without the parts to be connected.

Figure 3 shows an application of the present invention where a device or body 31 is connected to another device or casing 30. The tightening or clamping means 39 are of such configuration as to extend over both fitting cylinders 34 and 35 which have different diameters. Device 31 may be a machine, for example, a rotary pump which is driven by means of a shaft 32 and a coupling 33; the fitting surfaces 34 and 35 which are part of device 31 and have different diameters fit into corresponding surfaces 34' and 35' of an extension 36 of the casing or body 30 whereby cylinder part 34 and surface 35' are of equal length so that the edges 34" and 35" of the extension of body 31 forming cylinder parts 34 and 35 simultaneously pass through the edges 36' and 36" respectively of extension 36 in the same manner as is the case in the device illustrated in Fig. 1. Extension 36 has a cone shaped exterior surface which carries the rollers 37 with their cage 38; tightening ring 39 surrounds with its interior cone shaped surface 39' the rollers 37; the conicity of surface 39' corresponds to that of the cone surface of extension 36. Tightening and rigid connection of parts 30 and 31 is done in the same manner as of parts 1 and 4 of the device shown in Fig. 1.

Figure 4 shows an internal tightening device in which the tightening member also extends over the two cylindrical fitting surfaces of different diameters. 40 may be a hollow shaft to which the hub 41 of a rotating engine part, for example, a wheel or a propeller must be rigidly connected and truly aligned. Shaft 40 is provided with cylinder surfaces 42 and 43 of different diameters. Hub 41 has two bores corresponding to the cylinder surfaces. The edges 43' and 42' of part 40 simultaneously pass over the edges 41' and 41" of the hub 41 when the shaft is inserted into the hub. The extreme end of the bore of shaft 40 is conical; a plug or tightening member 46 has a cone surface of same conicity as the bore of shaft 40 and is inserted into the shaft whereby rollers 44 and roller cage 45 are disposed between the cone 46 and the bore. By means of a spanner which fits over the square 47 attached to plug 46 the latter may be revolved and driven into the bore of shaft 40 whereby the shaft is expanded and pressed to the interior of hub 41.

As shown in Figs. 1, 3 and 4 the edges 2', 3', 34", 35", 42' and 43' of the fitting surfaces of the member to be inserted may be inclined to facilitate assembling; similarly the edges of 5', 6', 36', 36", 41' and 41" of the member into which the member to be connected is inserted may be inclined or rounded.

The fitting surfaces 2, 3, 34', 35', 42 and 43 and the surfaces corresponding thereto need not be cylindrical; as set forth it is however, desirable that they are of different radial extension and of such length that the extreme edge and the one formed because of the different radial extensions enter the corresponding edges of the counter part simultaneously.

While I believe the above described embodiments of my invention to be preferred embodiments, I wish it to be understood that I do not desire to be limited to the exact details of method, design and construction shown and described, for obvious modifications will occur to a person skilled in the art.

I claim:

In a disconnectable clamping connection for disconnectably connecting two parts, each part being provided with a plurality of cylindrical fitting surfaces and the surfaces of one part fitting into the surfaces of the other part, one of said parts having a cone shaped surface adjacent to and concentric with at least one of said circular surfaces, a tightening member having a cone shaped surface which corresponds to and is disposed adjacent to said first mentioned cone shaped surface, and a plurality of roller means disposed in between said cone shaped surfaces whereby upon rotation and axial displacement of said tightening member said roller means are pressed to said first mentioned cone surface, and the part having said first mentioned cone surface is elastically deformed and pressed and securely held to the other part.

WILHELM GUSTAV OTTO STIEBER.